(12) United States Patent
Claringburn

(10) Patent No.: US 7,609,970 B2
(45) Date of Patent: Oct. 27, 2009

(54) ADD/DROP NODE FOR AN OPTICAL COMMUNICATIONS NETWORK

(75) Inventor: Harry Richard Claringburn, Westdale Lane (GB)

(73) Assignee: Ericsson AB, Stockholm (SE)

( * ) Notice: Subject to any disclaimer, the term of this patent is extended or adjusted under 35 U.S.C. 154(b) by 442 days.

(21) Appl. No.: 10/506,924

(22) PCT Filed: Mar. 14, 2003

(86) PCT No.: PCT/GB03/01082

§ 371 (c)(1),
(2), (4) Date: Apr. 25, 2005

(87) PCT Pub. No.: WO03/079597

PCT Pub. Date: Sep. 25, 2003

(65) Prior Publication Data

US 2005/0226619 A1 Oct. 13, 2005

(30) Foreign Application Priority Data

Mar. 14, 2002 (GB) .................................. 0206049.9

(51) Int. Cl.
*H04J 14/02* (2006.01)
(52) U.S. Cl. .......................................... 398/83; 398/82
(58) Field of Classification Search .................... 398/79, 398/82–83, 135
See application file for complete search history.

(56) References Cited

U.S. PATENT DOCUMENTS 5,337,175 A  8/1994 Ohnsorge et al.
6,084,694 A  7/2000 Milton et al.
6,493,117 B1 * 12/2002 Milton et al. ................ 398/49
2002/0041411 A1 * 4/2002 Persson et al. .............. 359/124

OTHER PUBLICATIONS

Ezhan Karasan et al., "Optical restoration at the wavelength-multiplex-section level in WDM mesh networks", IEEE Photonics Technology Letters, vol. 10, pp. 1343-1345, 1998.*
Coffman, K., *The Role of Optical Layer Cross-Conencts in Emerging Network Architectures*, IEEE, vol. 2, Oct. 22, 2000, pp. 1199-1203.
Gottlieb, A. M., et al., *Monet WDM Network Elements*, Military Communications Conference Proceedings, 1999, Milcom 1999, IEEE Atlantic City, NJ, Oct. 31, 1999, pp. 963-967.
Kuznetsov, M., et al., *A Next-Generation Optical Regional Access Network*, IEEE Communications Magazine, IEEE Service Center, Piscataway, NJ, vol. 38, Jan. 2000, pp. 66-72.
Lee, K.C., et al., *Routing and Switching in a Wavelength Convertible Optical Network, Networking: Foundation for the Future*, San Francisco, Proceedings of the Annual Joint Conference of the Computer and Communications Societies (INFOCOM), vol. 2, Mar. 28, 1993, pp. 578-585.

* cited by examiner

*Primary Examiner*—Quan-Zhen Wang
(74) *Attorney, Agent, or Firm*—Kirschstein, et al.

(57) ABSTRACT

A 1550 nm DWDM optical communications network has a 1300 nm remote node added to which a small number of channels can be added or dropped. The additional node includes dual wavelength couplers to enable 1300 nm wavelength signals to be added or dropped. The 1300 nm signals are demultiplexed using a WDM filter and connected into the transponders of the 1550 nm nodes for transportation around the node. Signals for the remote network are converted to 1300 nm signals at the 1550 nm node transponders and multiplexed onto the network to be dropped to the network node transponder.

11 Claims, 3 Drawing Sheets

ADD/DROP NODE FOR AN OPTICAL COMMUNICATIONS NETWORK

This invention relates to optical communications networks, and in particular to add/drop nodes for adding signals to, and dropping signals from, the network.

Modern optical communications networks modulate traffic using C band wavelengths based on 1550 nm. A typical network operates at 10 Gbit with network nodes spaced many kilometres apart. Photonic add/drop equipment for these networks is very expensive. Moreover the optical signal to noise ratio (OSNR) degrades as additional nodes are added. Deploying a large number of nodes in a ring network will lead to very poor performance. Because of these dual constraints, if only a small number of channels are required to be added or dropped at a node it may not be economical or even desirable from the point of view of the OSNR to include the node on the network.

There is, therefore, a problem in adding nodes requiring small number of channels, both from the point of view of OSNR and expense.

The present invention aims to overcome that problem. Broadly, the invention provides a remote node operating with a different set of wavelength signals in conjunction with the major add/drop nodes of the network. The major nodes are used to transport add/drop traffic from the remote node around the network.

More specifically, there is provided a DWDM optical communications network having a plurality of network nodes each for adding and dropping signals to the network at a first set of wavelengths, and a further node for adding and dropping signals at a second set of wavelengths, the further node being arranged between adjacent nodes of the plurality of nodes, the further node comprising a first dual wavelength coupler for dropping signals at the second set of wavelengths from the network and a second dual wavelength coupler for adding a second set of wavelengths onto the network, and wherein the adjacent nodes of the plurality of nodes include transponders for transmitting signals received at the second set of wavelengths onto the network at the first set of wavelengths, and receiving from the network, signals at the first set of wavelengths to be passed to the further node at the second set of wavelengths.

Embodiments of the invention have the advantage that a low cost remote node can be constructed using components for a 1300 nm network which are much cheaper than 1550 nm DWDM network components. The remote node is only needed to drop/add a few channels. As the wavelengths of the 1300 nm signals are so far from the 1550 nm signals, any noise from the remote node signal does not affect the 1550 nm OSNR.

Preferably, the transponders of adjacent network nodes include means for converting signals at the second set of wavelengths used by the remote node, preferably 1300 nm, to the first set of wavelengths used by the network nodes, preferably 1550 nm, and vice versa. Lower quality non-wavelength locked lasers may be used to convert to the second set of wavelengths further reducing cost.

An embodiment of the invention will now be described, by way of example only, and with reference to the accompanying drawings, in which.

Figure 1:
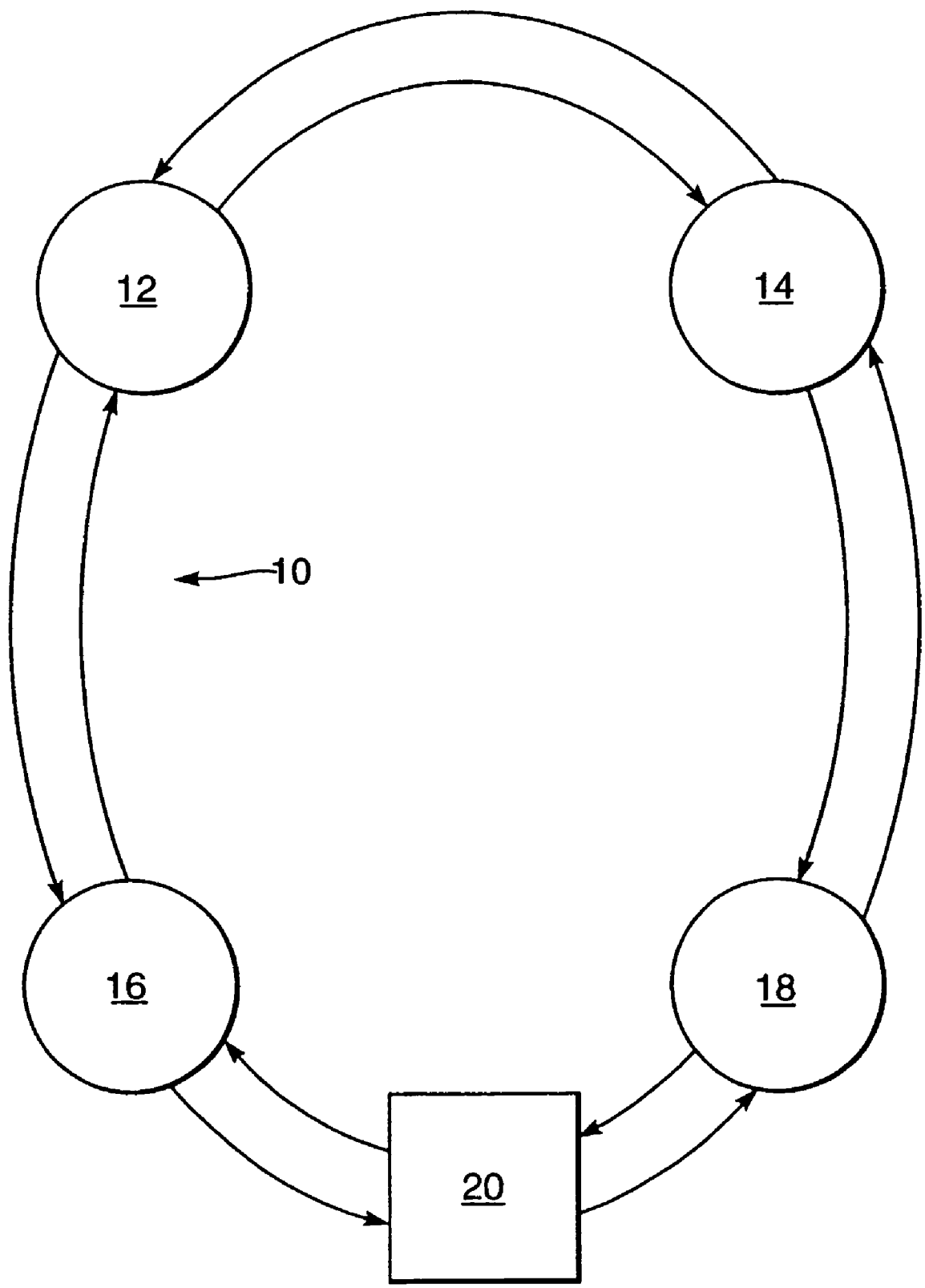
FIG. 1 is a schematic view of a ring network including a remote add/drop node embodying the invention.

FIG. 1 illustrates a ring network 10 such as a Marconi PMA 32 optical network which carries 10 Gbit/s traffic using a 32 channel multiplex based on a carrier wavelength of 1550 nm. A number of add/drop nodes 12 to 18 are spaced at intervals of several kilometres, say about 100 km around the network. A remote node 20 is arranged between two of the add/drop nodes 16, 18. The remote node can be seen as a cut down version of the add/drop nodes 12 to 18 which operates at a different carrier wavelength, for example 1300 nm and which is invisible to the 1550 nm DWDM (dense wave division multiplex) network. The components required to build a 1300 nm node are very much cheaper than those required for a 1550 nm node and noise on the 1300 nm node will not affect the OSNR of the 1550 nm network.

Figure 2:
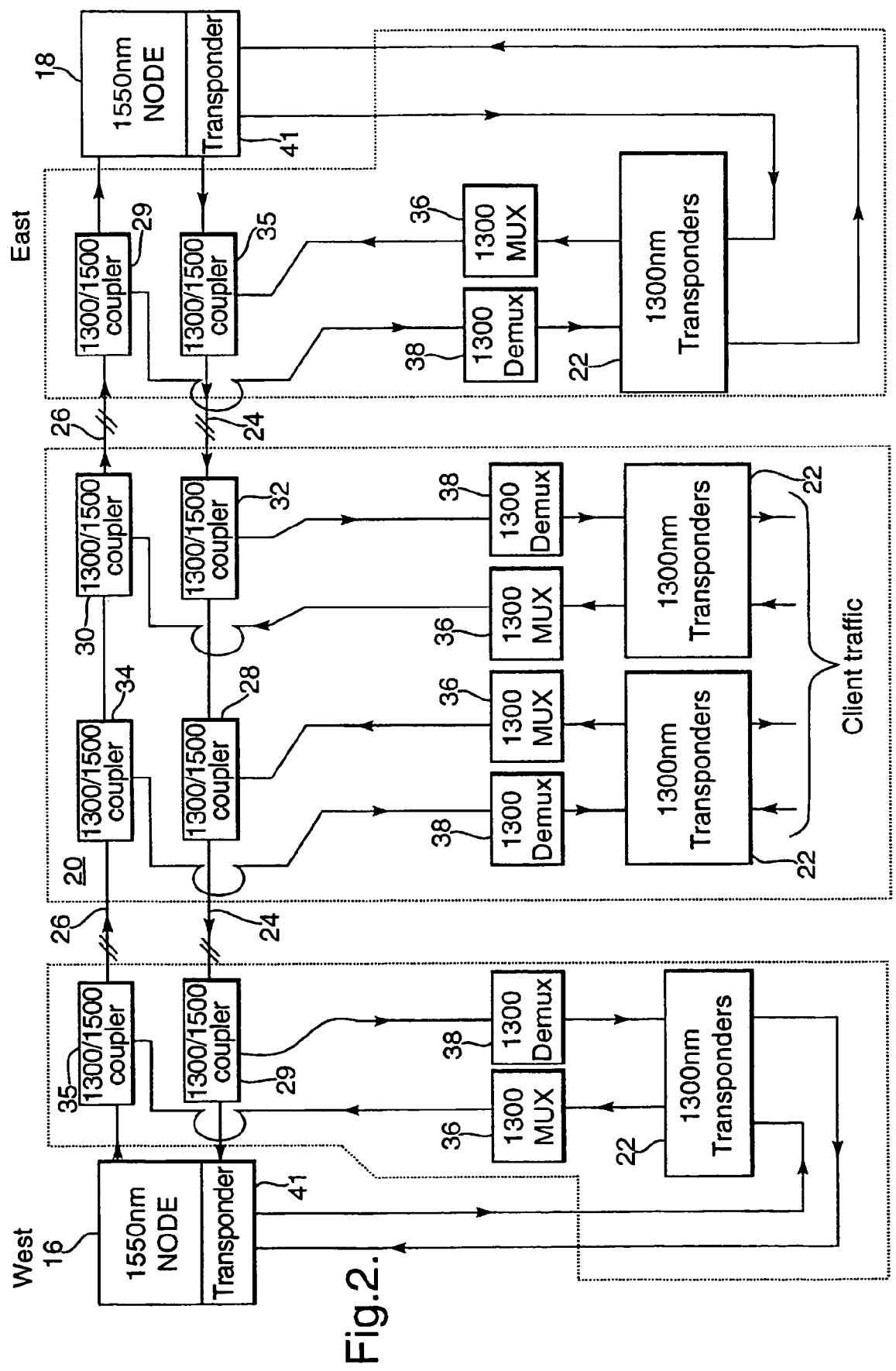
FIG. 2 shows the remote node an adjacent network nodes in more detail.

FIG. 2 shows the remote node in more detail. The node is arranged between two main photonic add/drop nodes 16, 18 of the 1550 nm network. That network is a two fibre network with one fibre 26 carrying traffic in a West/East direction (W/E) and the other fibre 24 carrying traffic in the East/West (E/W) direction. East and West are used conventionally and do not correspond to geographical east and west.

The remote node 20 comprises low cost 1300 nm transponders 22 whose wavelengths are such that they can be used with a coarse WDM filter system. The outputs from the transponders are combined and coupled onto the main 1550 nm network fibres 24, 26 using low loss 1300/1550 nm couplers 28, 30. For protection purposes the 1300 nm signals are transported to the main network nodes 16, 18 where the signal is demultiplexed using a further 1300/1550 nm coupler 29. Using another coarse WDM filter, shown as demultiplexer 38 the 1300 nm composite signal is demultiplexed back into its individual channels which are connected into the transponders 41 of the main network node via 1300 nm transponders 22 for transportation around the ring. Signals dropped by the main network node undergo the reverse procedure with signals from the 1500 nm transponders being passed to 1300 nm transponders 22, multiplexed by a 1300 nm signal multiplexer 36 and coupled onto the fibres 24, 26 using a further coupler 35.

Thus, in FIG. 2, client traffic at the remote node is received at or transmitted from one of a pair of W/E, E/W transponders 22. Traffic to be added to the network is multiplexed by a 1300 nm signal multiplexer 36 and the 1300 nm signal multiplex is added to the network by 1300/1550 nm add coupler 28 for traffic to be added to the EIW fibre 24 and by 1300/1550 nm add coupler 30 for traffic to be added to the W/E fibre 26. Traffic to be dropped from the network to the transponders 22 is dropped by a 1300/1550 splitter coupler 32, 34 on each of the two fibres on the network and then demultiplexed by demultiplexers 38 to restore the individual channels which are received by the transponders 22.

Thus, each of the fibres has a pair 1300/1550 nm couplers arranged between adjacent 1550 nm nodes. Traffic on the fibre between the couplers will be mixed 1550 nm and 1300 nm traffic. However, the noise generated by the 1300 nm components will not affect the 1550 nm network and so the noise budget of the network will not be affected by the remote node.

Traffic which has been placed on the network from the remote node cannot be transported around the network as a 1300 nm signal due to fibre loss and amplifier limitations. Thus, considering the W/E path 26, traffic is coupled onto the fibre 26 by add coupler 30. The 1300 nm traffic is dropped by splitter coupler 34, demultiplexed by the multiplexer 38 into the individual channels. These channels are passed to the main 1550 nm network node transponders where they are transported around the ring network as 1550 nm signals.

Figure 3:
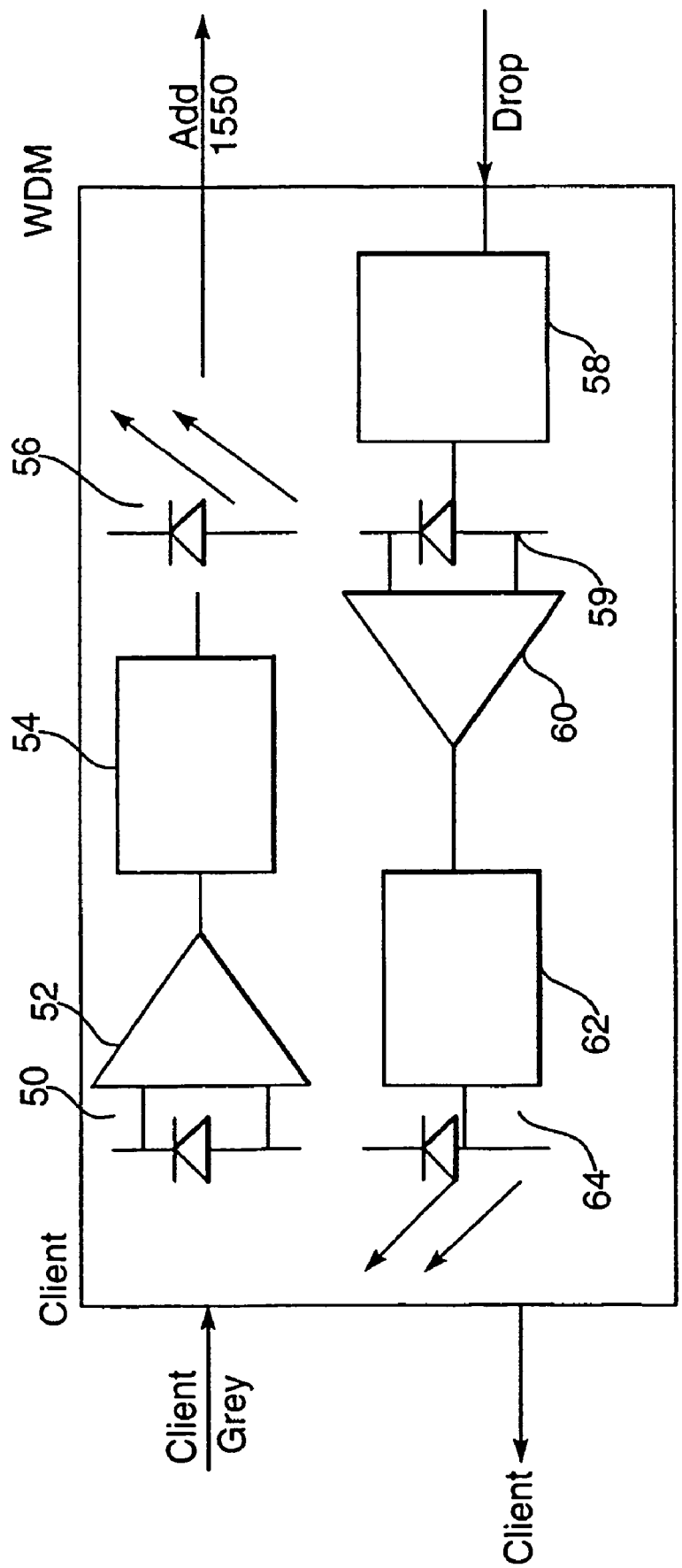
FIG. 3 shows the remote node transponder.

FIG. 3 shows the transponder at the 1550 nm nodes required to add and drop the 1300 nm signal to and from the network. On the add side, a grey, non wavelength specific signal is received and is converted to an electrical signal by photo diode 50 and amplified by amplifier 52.

At 54, after retiming, the signal may be further processed to add error detection and system management information before being re-transmitted at the required wavelength by laser 56.

On the drop side, a received signal is converted to an electrical signal by a photodiode 59 and an amplifier 60. After retiming at 62, the signal may be further processed to detect errors and management information. The signal is converted back to an optical signal by laser 64. This is a grey laser which is inexpensive and which outputs a grey signal to the client.

At the remote node, the lasers used in the transponders can be non-wavelength locked and directly modulated. As these nodes only use a small number of channels, which is why a full 1550 nm node is not needed, they may be WDM transponders instead of the dense WDM required on the main network. As the channels are spaced further apart on a WDM network than on a DWDM network, controlling drift of the laser with temperature may not be required, further simplifying the construction.

Thus, the embodiment described further provides a low cost remote node for an optical network that is suitable for use where the channel requirement is not large enough to warrant a full node. The node functions at a different wavelength to the main network so that any noise at that wavelength introduced onto the network does not affect the OSNR of the main network.

Various modifications to the embodiment described are possible and will occur to those skilled in the art without departing from the invention which is defined by the following claims.

The invention claimed is:

1. A dense wavelength division multiplexing (DWDM) optical communications network, comprising:
   a plurality of network nodes spaced apart from each other around the network, for bidirectionally carrying traffic signals between the network nodes only over a first set of carrier wavelengths based on 1550 nm, each network node being operative for adding traffic signals to, and dropping traffic signals from, the network only over the first set of carrier wavelengths based on 1550 nm;
   a remote node spaced between an adjacent pair of the network nodes, and including dual wavelength couplers for adding traffic signals to, and dropping traffic signals from, the adjacent pair of the network nodes only over a different second set of carrier wavelengths based on 1300 nm; and
   a plurality of transponders at the adjacent pair of the network nodes, for converting the traffic signals added by the couplers at the remote node from the different second set of carrier wavelengths based on 1300 nm to the first set of carrier wavelengths based on 1550 nm for transmission around the network, and for converting the traffic signals dropped by the couplers at the remote node from the first set of carrier wavelengths based on 1550 nm to the different second set of carrier wavelengths based on 1300 nm for removal from the network.

2. The DWDM optical communications network according to claim 1, wherein the network carries signals at both of the first and the second sets of carrier wavelengths only between the dual wavelength couplers and the adjacent pair of the network nodes.

3. The DWDM optical communications network according to claim 1, wherein the remote node comprises a splitter for splitting a traffic signal received from the network into a plurality of channels each at one of the different second set of carrier wavelengths based on 1300 nm.

4. The DWDM optical communications network according to claim 3, wherein the splitter comprises an optical demultiplexer.

5. The DWDM optical communications network according to claim 3, wherein the remote node comprises a combiner for combining the channels into a traffic signal for addition onto the network.

6. The DWDM optical communications network according to claim 5, wherein the combiner comprises a multiplexer.

7. The DWDM optical communications network according to claim 1, wherein each transponder comprises a first converter for converting a traffic signal received at one of the different second set of carrier wavelengths based on 1300 nm into an electrical signal, and a second converter for converting the electrical signal to an optical signal at one of the first set of carrier wavelengths based on 1550 nm.

8. The DWDM optical communications network according to claim 1, wherein each transponder comprises a bandpass filter for filtering a traffic signal received from the network to select a single carrier wavelength, a first converter for converting the selected carrier wavelength into an electrical signal, and a second converter for converting the electrical signal to a grey optical signal at one of the different second set of carrier wavelengths based on 1300 nm.

9. The DWDM optical communications network according to claim 1, wherein the remote node comprises a transponder that includes a first converter for converting a traffic signal for addition to the network at the different second set of carrier wavelengths based on 1300 nm into an electrical signal, and a second converter for converting the electrical signal to a wavelength division multiplexing (WDM) optical signal at the different second set of carrier wavelengths based on 1300 nm.

10. The DWDM optical communications network according to claim 1, wherein the different second set of carrier wavelengths is less in number than the first set of carrier wavelengths.

11. A dense wavelength division multiplexing (DWDM) network node in a DWDM optical communications network for transmitting and receiving traffic signals only at a first set of carrier wavelengths based on 1550 nm, the DWDM network node comprising:
   a multiplexer for multiplexing traffic signals only at the first set of carrier wavelengths based on 1550 nm for addition to the network;
   a demultiplexer for demultiplexing traffic signals only at the first set of carrier wavelengths based on 1550 nm received from the network;
   a transponder for transmitting traffic signals at a different second set of carrier wavelengths based on 1300 nm received from a remote node to the multiplexer at the first set of carrier wavelengths based on 1550 nm, and for receiving from the demultiplexer traffic signals at the first set of carrier wavelengths based on 1550 nm to be passed to the remote node at the second set of carrier wavelengths based on 1300 nm;
   a 1300 nm/1550 nm coupler for combining signals output from the transponder at the second set of carrier wavelengths based on 1300 nm with traffic signals at the first set of carrier wavelengths based on 1550 nm; and
   a 1300 nm/1550 nm splitter for splitting traffic signals at the second set of carrier wavelengths based on 1300 nm received from the remote node from traffic signals received at the first set of carrier wavelengths based on 1550 nm.

* * * * *

UNITED STATES PATENT AND TRADEMARK OFFICE
CERTIFICATE OF CORRECTION

PATENT NO. : 7,609,970 B2  Page 1 of 1
APPLICATION NO. : 10/506924
DATED : October 27, 2009
INVENTOR(S) : Claringburn It is certified that error appears in the above-identified patent and that said Letters Patent is hereby corrected as shown below:

In Column 2, Line 40, delete "EIW" and insert -- E/W --, therefor.

Signed and Sealed this

Ninth Day of March, 2010

David J. Kappos
*Director of the United States Patent and Trademark Office*